United States Patent Office 2,695,289
Patented Nov. 23, 1954

2,695,289

BASIC POLYMETHINE DYESTUFFS

Werner Müller, Koln, and Carl Berres, Leverkusen-Wiesdorf, Germany, assignors to Farbenfabriken Bayer Aktiengesellschaft, Leverkusen, Germany, a corporation of Germany No Drawing. Application February 28, 1951,
Serial No. 213,286

Claims priority, application Germany March 9, 1950

5 Claims. (Cl. 260—240)

The present invention relates to new basic polymethine dyestuffs and to a process for making these dyestuffs.

Hitherto it was not possible to prepare technically valuable basic polymethine dyestuffs dyeing neutral red to yellowish red shades. In order to obtain such shades dyers have up to date had recourse to the use of dyestuff mixtures with their inherent drawbacks, particularly in most cases a more or less strongly reduced clearness of the shades. Though it is possible to synthesize compounds of the desired shades in the series of the pyronine dyestuffs, they are either not easily accessible or their general properties proved to be not sufficient for a practical use, so that they were not accepted by the dyers.

It is, therefore, an object of this invention to make basic polymethine dyestuffs of these long desired qualities. These new dyestuffs correspond to the general formula:

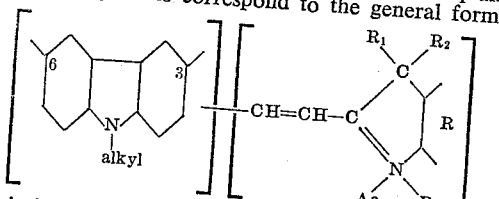

In this formula

R stands for a benzene or naphthalene nucleus, R₁, R₂ and R₃ stand for hydrogen or organic radicals, Ac means an acid radical, and $n$ one of the numbers 1 and 2. The aromatic nuclei of these dyestuffs may be substituted in any desired way.

The new dyestuffs can be obtained by condensing in known manner N-alkylcarbazole-3- or -6-aldehydes or N-alkylcarbazole-3,6-dialdehydes with one or two moles— as the case may be—of α-methylindolines.

The N-alkylcarbazole aldehydes used in this process can be obtained by known processes, e. g. described by Vilsmeier and Haak in Berichte der Deutschen Chemischen Gesellschaft, vol. 60, p. 119, or in German Patents 514,415, 519,806 and others. N-alkylcarbazoles suited for the preparation of these aldehydes are e. g. N-methylcarbazole, N-ethylcarbazole, N-propylcarbazole, N-butylcarbazole, N-hydroxyethylcarbazole, N-ω-halogenoethylcarbazoles, further the nuclear substitution products of the mentioned carbazoles, e. g. the halogeno-, cyano-, alkyl-, alkoxy-N-alkyl-carbazoles. Suitable α-methylindolines are e. g. 1,3,3-trimethyl-2-methylene indoline, 1,3,3-trimethyl-2-methylene-α- and -β-naphthindolines, the nuclear halogeno, cyano, nitro, alkyl, alkoxy substitution products thereof.

The new red basic polymethine dyestuffs are distinguished by outstandingly clear shades, high dyeing strength, strikingly good fastness to light of dyeings on cellulose acetate and other plastics, good wet fastness properties; further they can easily be converted into lakes and show a very good solubility in alcoholic solvents by which property they can be used as so-called spirit colors. Their fatty acid salts can be used with great advantage in the various specific fields of application.

The following examples illustrate the invention, without, however, restricting it thereto, the parts being by weight:

Example 1

160 parts of phosphorus oxychloride are run into a solution of 446 parts of N-ethylcarbazole-3-aldehyde and 364 parts of 1,3,3-trimethyl-2-methylene indoline in 1000 parts of o-dichlorobenzene at a temperature of 70–75° C. The mixture is then heated for about 30 minutes to 95° C. Thereafter the reaction mixture is poured into water, and the o-dichlorobenzene is blown off by means of steam. On cooling the dyestuff solidifies to a crystalline substance. After sucking off it is first washed out with much diluted hydrochloric acid and then with water. By re-dissolving from water the dyestuff is obtained in a very pure form and in a good yield. It corresponds to the formula:

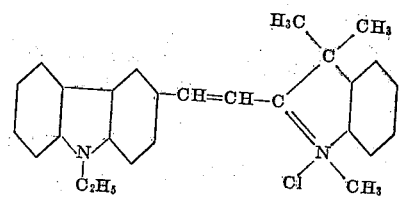

and dyes acetate rayon in pure, very clear red tints of good fastness properties.

The N-ethylcarbazole-3-aldehyde is prepared after the method of Vilsmeier and Haak. It melts at a temperature of 88° C. If care is taken for a good agitation, the manufacture of the dyestuff can also be carried out without a solvent. In this case, a steam distillation is not necessary. The dyestuff components can be successfully condensed also in glacial acetic acid by heating.

In the same manner also substituted 1,3,3-trimethyl-2-methylene indoline can be condensed with N-alkylcarbazole aldehydes to dyestuffs. By condensing, for instance, N-ethylcarbazole-3-aldehyde with p-chloro- or p-methoxy-1,3,3-trimethyl-2-methylene indoline, dyestuffs of equally good properties are obtained being slightly redder than the unsubstituted dyestuff.

Example 2

By condensing N-ethylcarbazole-3,6-dialdehyde with 2 mols of 1,3,3-trimethyl-2-methylene indoline, a dyestuff is obtained which dyes cotton mordanted with tannic acid somewhat redder than the corresponding dyestuff from N-ethylcarbazole-3-aldehyde (cf. Example 1).

The N-ethylcarbazole-3,6-dialdehyde is obtained by the action of an excess of a mixture of N-methylformanilide and phosphorus oxychloride on N-ethylcarbazole at a temperature of about 65° C. It melts at 172° C.

We claim:

1. New basic polymethine dyestuffs of the general formula

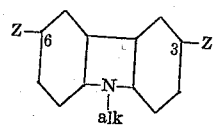

wherein Z is selected from the group consisting of hydrogen and the radical

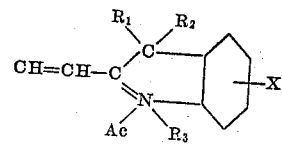

in which X stands for one of the group consisting of hydrogen, halogen, —NO₂, alkyl, and alkoxy, at least one Z being said radical; R₁, R₂, R₃, and alk stand for lower alkyl radicals.

2. The new basic polymethine dyestuff of the formula:

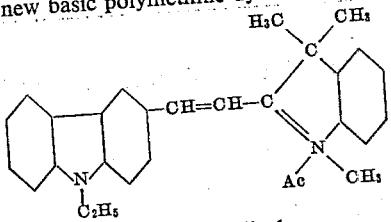

in which Ac stands for an acid radical.

3. The new basic polymethine dyestuff of the formula:

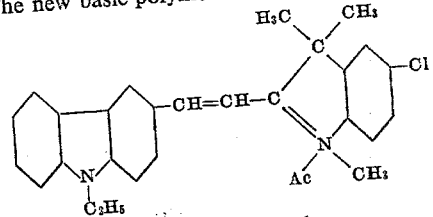

in which Ac stands for an acid radical.

4. The new basic polymethine dyestuff of the formula:

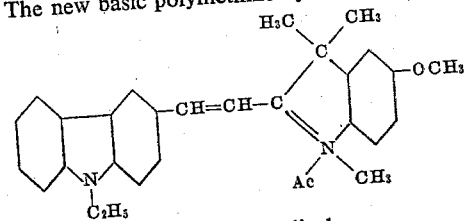

in which Ac stands for an acid radical.

5. The new basic polymethine dyestuff of the formula:

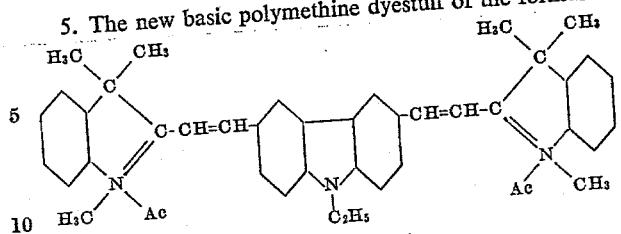

in which Ac stands for an acid radical.

References Cited in the file of this patent

UNITED STATES PATENTS

| Number | Name | Date |
|---|---|---|
| 2,028,141 | Ackerman | Jan. 2, 1936 |

FOREIGN PATENTS

| Number | Country | Date |
|---|---|---|
| 469,748 | Great Britain | 1937 |